C. E. JUDKINS.
HOSE COUPLING.
APPLICATION FILED DEC. 4, 1911.

1,042,684.

Patented Oct. 29, 1912.

2 SHEETS—SHEET 1.

Witnesses
C. J. MacCarter
Harry M. Test

Inventor
C. E. Judkins.
By Harry Ellis Chandlee
Attorney

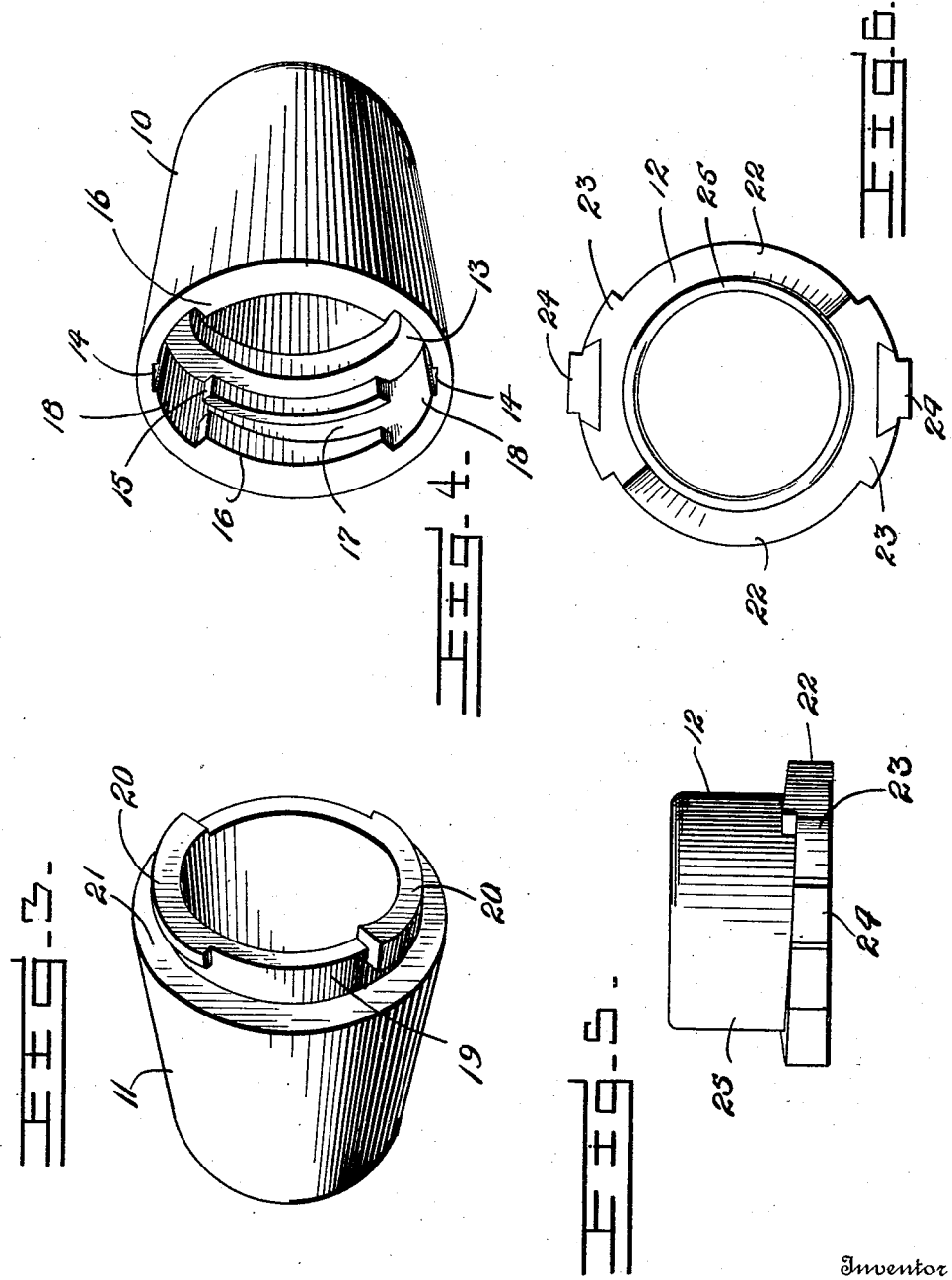

UNITED STATES PATENT OFFICE.

CHARLES E. JUDKINS, OF COLUMBIA RIVER, WASHINGTON, ASSIGNOR OF ONE-HALF TO CAESAR MASINI, OF COEUR D'ALENE, IDAHO.

HOSE-COUPLING.

1,042,684.  Specification of Letters Patent.  Patented Oct. 29, 1912.

Application filed December 4, 1911. Serial No. 663,821.

*To all whom it may concern:*

Be it known that I, CHARLES E. JUDKINS, a citizen of the United States, residing at Columbia River, in the county of Douglas and State of Washington, have invented certain new and useful Improvements in Hose-Couplings, of which the following is a specification.

This invention relates to improvements in hose couplings, and has particular reference to a coupling adapted for use with flexible hose such as fire hose.

The principal object is to provide a simple device of this character which may be quickly and easily connected and disconnected and so formed as to obviate the necessity of the use of gaskets.

Other objects and advantages will be apparent from the following description and with particular reference to the accompanying drawings.

Figure 2:
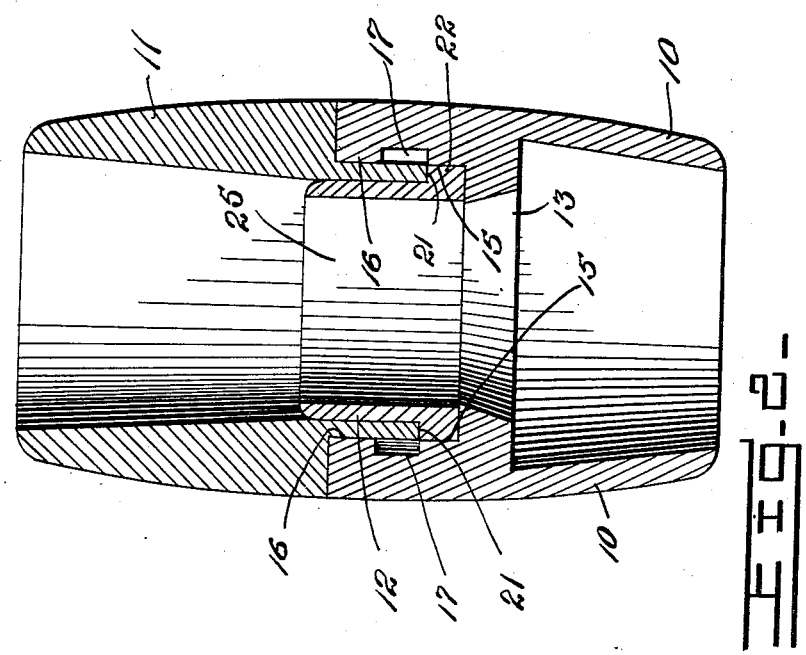
Figure 1:
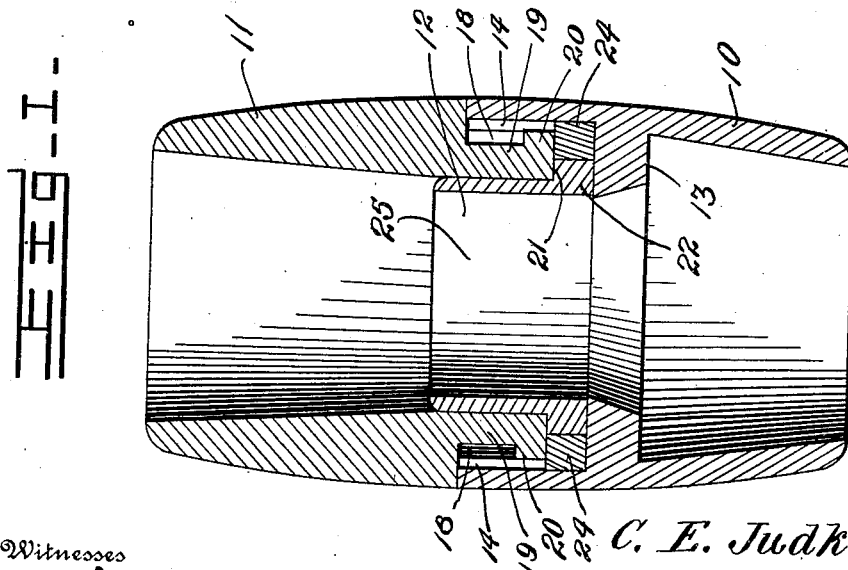

In the drawings: Figure 1 is a vertical longitudinal section through the parts of the coupling assembled. Fig. 2 is a longitudinal section at right angles to that taken in Fig. 1. Fig. 3 is a perspective view of one outer member of the coupling. Fig. 4 is a perspective view of the other outer member of the coupling. Fig. 5 is a perspective view of inner member of the coupling. Fig. 6 is an end view of the inner member 12.

Referring to the drawings, the coupling comprises primarily the outer members 10 and 11, and the inner member 12.

The member 10 is an approximately cylindrical member having arranged therein an annular stop wall 13, and running longitudinally from one end of the member to the stop wall and on diametrically opposite sides of the member 10 are the grooves 14, which will be more fully described in connection with the other parts of the coupling. Between the grooves 14 on diametrically opposite sides of the coupling member are the parallel ribs 15 and 16 the former of which lie just beyond the wall 13, and the ribs 16 lie flush with the end face of the member and provide the slide-ways 17 therebetween, the spaces 18 being left between the ends of the ribs 15 and 16. These slide-ways 17 are inclined circumferentially and outwardly toward the end of the member 10.

The member 11 is a similarly shaped member to the member 10 and has a reduced extension 19 on one end, and formed on the periphery of said extension at opposite points are the circumferentially tapered ribs 20, said ribs being of such length as to fit snugly into the space 18, and when members 10 and 11 are rotated in opposite directions the ribs 20 will engage in the ways 17 between the ribs 15 and 16 and draw the parts tightly together. The end face of the member 10 and the end face 21 of the member 11 are ground so that they fit to form a perfectly smooth water tight joint. The member 12 consists of a ring 22 having formed on diametrically opposite points the ribs 23 which are adapted to fit snugly into the spaces 18. Extending from the outer face of each of the ribs 23 and centrally thereof is a lug 24 which lugs are adapted to slide into the grooves 14 when the parts are assembled. Extending from one side of the ring 22 is a thin tubular member 25 which is adapted to be inserted in the member 11 and frictionally engage the inner wall of said member.

When the parts are to be assembled the member 12 is first secured within the member 11. The member 10 is then brought into such position that the lugs 24 are in line with the grooves 14 whereupon the members 10 and 11 are pushed together into engagement. Then upon turning the member 11 to the right and the member 10 to the left the ribs 20 will engage between the ribs 15 and 16, and draw the parts tightly together. The engaging outer portions of the members 10 and 11, and the stop wall 13 and the end face of the member 12 being ground joints will prevent any possibility of leaking when the parts are assembled.

What is claimed is:

A hose coupling comprising a pair of tubular members, an annular stop wall within one of said members, pairs of parallel ribs positively arranged in one end of said member so as to form an inclined space between the ribs of each pair, said member having diametrically opposite longitudinal grooves arranged between the ends of said ribs, a second coupling member having a reduced extension formed with ribs, said ribs being tapered in a direction circumferentially of the coupling member to form shoulders adapted for insertion between the ends of the first-named ribs and engagement in the spaces between said first-named ribs, a removable intermediate member having means for engagement with the second-named coupling member, said intermediate member having oppositely disposed ribs tapering in a direction opposite to that of the first-named tapered ribs, to form shoulders for engagement with the shoulders of the ribs of the second-named coupling member, and centrally arranged and radially projecting lugs on the ribs of the intermediate member, for engagement in the grooves of the first-named coupling member.

In testimony whereof I affix my signature, in the presence of two witnesses.

CHARLES E. JUDKINS.

Witnesses:
W. J. MALLOY,
MATTIE SCHANCK.

Copies of this patent may be obtained for five cents each, by addressing the "Commissioner of Patents, Washington, D. C."